(12) United States Patent
Murray et al.

(10) Patent No.: US 12,313,302 B2
(45) Date of Patent: May 27, 2025

(54) FURNACE ACCESSORY

(71) Applicant: Ecofurn, LLC, Riverview, MI (US)

(72) Inventors: Christopher J. Murray, Chicago, IL (US); William J. Fienup, Chicago, IL (US); Chris A. Cunningham, Brownsburg, IN (US); Thomas Benton Brock, Brownstown, MI (US)

( * ) Notice: Subject to any disclaimer, the term of this patent is extended or adjusted under 35 U.S.C. 154(b) by 1640 days.

(21) Appl. No.: 15/731,784

(22) Filed: Jul. 31, 2017

(65) Prior Publication Data

US 2019/0032961 A1   Jan. 31, 2019

(51) Int. Cl.
*F24H 9/20* (2022.01)
*F23N 1/00* (2006.01)
(Continued)

(52) U.S. Cl.
CPC .......... *F24H 9/2085* (2013.01); *F23N 1/002* (2013.01); *F23N 1/022* (2013.01); *F23N 5/242* (2013.01); *F24H 3/0488* (2013.01); *F24H 3/065* (2013.01); *F24H 15/12* (2022.01); *F24H 15/124* (2022.01); *F24H 15/148* (2022.01); *F24H 15/156* (2022.01); *F24H 15/176* (2022.01); *F24H 15/20* (2022.01); *F24H 15/204* (2022.01);
(Continued)

(58) Field of Classification Search
CPC ........ F24H 9/2085; F23N 5/242; F23N 5/245; F23N 1/002; F23N 1/005; F23N 2035/14; F23N 2035/16
See application file for complete search history.

(56) References Cited

U.S. PATENT DOCUMENTS 5,307,990 A * 5/1994 Adams ................. F24H 9/2085
                                                          236/11
5,326,025 A * 7/1994 Dempsey ................ F23N 5/203
                                                           236/11
(Continued)

FOREIGN PATENT DOCUMENTS

JP       H01142317     * 11/1992

OTHER PUBLICATIONS

Translation of JPH01142317.*

*Primary Examiner* — Schyler S Sanks
(74) *Attorney, Agent, or Firm* — Paul E Schaafsma; NovusIP, LLC

(57) ABSTRACT

In accordance with the principals of the present invention, a furnace unit adapted to be installed in-line with a fuel source of a furnace modulates natural gas or propane to reduce fuel consumption, minimize temperature overshoot, and reduce furnace short cycling. A modulator is contained with the furnace unit. The modulator is in gaseous communication with the in-line gas fuel source. A furnace sensor senses furnace criteria related to the operation of the furnace. A microcontroller receives from the furnace sensor furnace criteria and controls the modulator based on the furnace criteria. In a further aspect of the invention, an environmental sensor can be provided to sense environmental criteria related to the operation of the furnace. In a further aspect of the invention, a base unit in electrical communication with the furnace unit can be provided, the base unit determining energy consumption usage and savings. This Abstract is submitted with the understanding that it will not be used to interpret or limit the scope or meaning of the claims.

27 Claims, 7 Drawing Sheets

(51) Int. Cl.

| | | |
|---|---|---|
| *F23N 1/02* | (2006.01) | |
| *F23N 5/24* | (2006.01) | |
| *F24H 3/04* | (2022.01) | |
| *F24H 3/06* | (2022.01) | |
| *F24H 15/12* | (2022.01) | |
| *F24H 15/124* | (2022.01) | |
| *F24H 15/148* | (2022.01) | |
| *F24H 15/156* | (2022.01) | |
| *F24H 15/176* | (2022.01) | |
| *F24H 15/20* | (2022.01) | |
| *F24H 15/204* | (2022.01) | |
| *F24H 15/208* | (2022.01) | |
| *F24H 15/238* | (2022.01) | |
| *F24H 15/242* | (2022.01) | |
| *F24H 15/258* | (2022.01) | |
| *F24H 15/269* | (2022.01) | |
| *F24H 15/281* | (2022.01) | |
| *F24H 15/325* | (2022.01) | |
| *F24H 15/36* | (2022.01) | |
| *F24H 15/395* | (2022.01) | |
| *F24H 15/464* | (2022.01) | |
| *G05D 23/19* | (2006.01) | |
| *F24H 15/34* | (2022.01) | |

(52) U.S. Cl.
CPC ......... *F24H 15/208* (2022.01); *F24H 15/238* (2022.01); *F24H 15/242* (2022.01); *F24H 15/258* (2022.01); *F24H 15/269* (2022.01); *F24H 15/281* (2022.01); *F24H 15/325* (2022.01); *F24H 15/36* (2022.01); *F24H 15/395* (2022.01); *F24H 15/464* (2022.01); *G05D 23/1927* (2013.01); *F23N 2223/08* (2020.01); *F23N 2235/14* (2020.01); *F23N 2235/16* (2020.01); *F24H 15/34* (2022.01)

(56) References Cited

U.S. PATENT DOCUMENTS

| | | | |
|---|---|---|---|
| 5,860,411 | A | 1/1999 | Thompson et al. |
| 6,244,515 | B1 | 6/2001 | Rowlette et al. |
| 6,749,423 | B2 | 6/2004 | Fredricks et al. |
| 7,033,165 | B1 | 4/2006 | Brown |
| 7,455,238 | B2 | 11/2008 | Huggens |
| 7,523,762 | B2 | 4/2009 | Buezis et al. |
| 7,731,096 | B2 | 6/2010 | Lorenz et al. |
| 8,123,518 | B2 | 2/2012 | Nordberg et al. |
| 8,275,484 | B2 | 9/2012 | Lorenz et al. |
| 8,764,435 | B2 | 4/2014 | Nordberg et al. |
| 8,876,524 | B2 | 11/2014 | Schultz et al. |
| 2005/0275528 | A1* | 12/2005 | Kates ............... G08B 1/08 340/539.22 |
| 2007/0235161 | A1 | 10/2007 | Berger et al. |
| 2008/0236561 | A1* | 10/2008 | Kaiser ............ F24H 1/0027 126/116 C |
| 2011/0057778 | A1 | 3/2011 | DeWitt et al. |
| 2011/0059760 | A1 | 3/2011 | DeWitt et al. |
| 2011/0275274 | A1 | 10/2011 | DeWitt et al. |
| 2012/0293335 | A1* | 11/2012 | Struyk ............ F23D 14/72 73/861 |
| 2016/0284193 | A1* | 9/2016 | Davis .............. G01M 3/16 |
| 2016/0377309 | A1* | 12/2016 | Abiprojo ......... G05B 19/042 700/276 |
| 2018/0291911 | A1* | 10/2018 | Ward .............. F04B 17/03 |

* cited by examiner

FURNACE ACCESSORY

FIELD OF THE INVENTION

The present invention relates to heating systems.

BACKGROUND OF THE INVENTION

In both commercial and residential buildings, heat is provided to an interior space by a furnace through intermediary fluid movement, which is often air, steam or hot water. Natural gas and propane are common fuel sources for furnaces. The components of a natural gas or propane-fired furnace can be divided into three categories: burners and heat exchangers; control and safety components; and pumps.

A flame originates at the burners and is drawn into a heat exchanger by a draft inducer. The heat produced by the combustion of the flame pass through the chambers of the heat exchanger and heat metal walls of the heat exchanger. The heat exchanger transfers heat as the fluids pass through. Exhaust gases are directed out of the building through vent pipes.

The controls include a thermostat, fluid valve, ignition control, igniter, flame sensor, transformer, limit control, pump control board, and flame roll out switch. A thermostat is basically an automatic switch that closes and completes an electrical circuit when the room temperature drops below the heat setting. This then initiates the heat sequence. The circuit board has a relay that closes to power up the motor on the draft inducer. Then the circuit board igniter energizes the hot surface igniter.

Next, the fluid valve relay in the circuit board is energized. This opens the valve to allow gas to flow to the burners. The gas flows into the burners and is ignited by the igniter. The circuit board timer counts a determined amount of time and energizes the pump relay. This relay powers up the pump motor (in the case of air, a blower) to push fluid through the heat exchanger. The heated fluid enters the piping (in the case of air, ductwork) to go to the various rooms in the house.

There are two configurations of furnace fluid valves in a typical residential/commercial furnace: single stage and multi-stage valves. Single stage fluid valves open to allow full fluid flow when the thermostat calls for heat, runs until the thermostat is satisfied, then it shuts off. There is usually a significant delay for the heat from the hot fluid to reach the thermostat. This results in a large temperature swing in the room (hot-cool, hot-cool), while the furnace burns excess fluid as it overshoots the temperature target.

Multi-stage fluid valves open to allow reduced fluid flow (small orifice) when the thermostat calls for heat and runs for a predetermined amount of time. If the thermostat is not already satisfied, the multi-stage valves opens to full flow and continues to run until the thermostat is satisfied before closing. The pump speed in the furnace increases from low to high speed when the fluid flow increases to maintain fluid-fluid ratios for optimal burn conditions. This results in the room temperature staying relatively constant (warm-cool, warm-cool), while the furnace burns less fuel as it is able to regulate room temperature and not overshoot the target temperature.

There are products on the market that claim to improve single stage furnaces; however, these devices do not perform adequately in that they attempt to rely on electrical control over existing furnace valve hardware. Thus, it would be desirable to improve upon the efficiency of single stage furnaces to save fuel, increase comfort, and reduce the costs of operation. It would further be desirable to be able to retrofit existing, installed single stage furnaces to become more efficient.

SUMMARY OF THE INVENTION

The present invention improves upon the efficiency of single stage furnaces to save fuel, improve comfort, and reduce the costs of operation. The present invention allows for existing, installed single-stage furnaces to be retrofitted to become more efficient.

In accordance with the principles of the present invention, a furnace unit adapted to be installed in-line with a fuel source of a furnace modulates natural gas or propane to reduce fuel consumption, minimizes temperature overshoot, and reduces furnace short cycling. A modulator is contained with the furnace unit. The modulator is in gaseous communication with the in-line gas fuel source. A furnace sensor senses furnace criteria related to the operation of the furnace. A microcontroller receives from the furnace sensor furnace criteria and controls the modulator based on the furnace criteria. In a further aspect of the invention, an environmental sensor can be provided to sense environmental criteria related to the operation of the furnace. In a further aspect of the invention, a base unit in electrical communication with the furnace unit can be provided, the base unit determining energy consumption usage and savings.

This Summary introduces concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF A PREFERRED EMBODIMENT

In accordance with the principles of the present invention, a unit external to the furnace and in-line with the fuel source is provided. The present invention modulates natural gas or propane to reduce fuel consumption, minimize temperature overshoot, and reduce furnace short cycling. The present invention also adjusts the pump motor speed to increase the furnace efficiency by regulating the fluid flow based on output temperature.

A furnace unit in accordance with the principals of the present invention can be installed outside of the furnace in-line with the gas feed. The present invention may be applied to both commercial and residential single-stage furnaces, whether utilizing as intermediary fluid movement air, steam or hot water; however, for ease of description use in conjunction with an air heating, single-stage, condensing furnace is described.

In accordance with an aspect of the present invention, a base unit in electrical communication with the furnace unit can determine energy consumption usage and savings. The present invention can provide wireless connectivity for end-users to monitor through a web-based computer interface or mobile device application, the fuel consumption and savings compared to fuel consumption without the furnace unit, including conversion of the data to dollars based upon the cost of fuel being consumed. End-users can also monitor real-time gas consumption and costs associated with the usage of the furnace with the furnace unit utilizing the web-based computer interface or mobile device application.

In addition to the furnace unit automatically adjusting gas flow, in an aspect of the present invention end-users can manually adjust gas flow through the furnace unit utilizing the web-based computer interface or mobile device application. The furnace unit can also have a sensor to detect furnace gas leaks, which can notify the end-user of the leak through the web-based computer interface or mobile device application. In accordance with an aspect of the present invention, the furnace unit can also have a sensor to detect carbon monoxide, which can immediately turn off the furnace so that the furnace stops creating carbon monoxide. In an aspect of the present invention, the furnace unit can also notify the end-user through the web-based computer interface and mobile device application if there is a power loss to the furnace.

Figure 1:
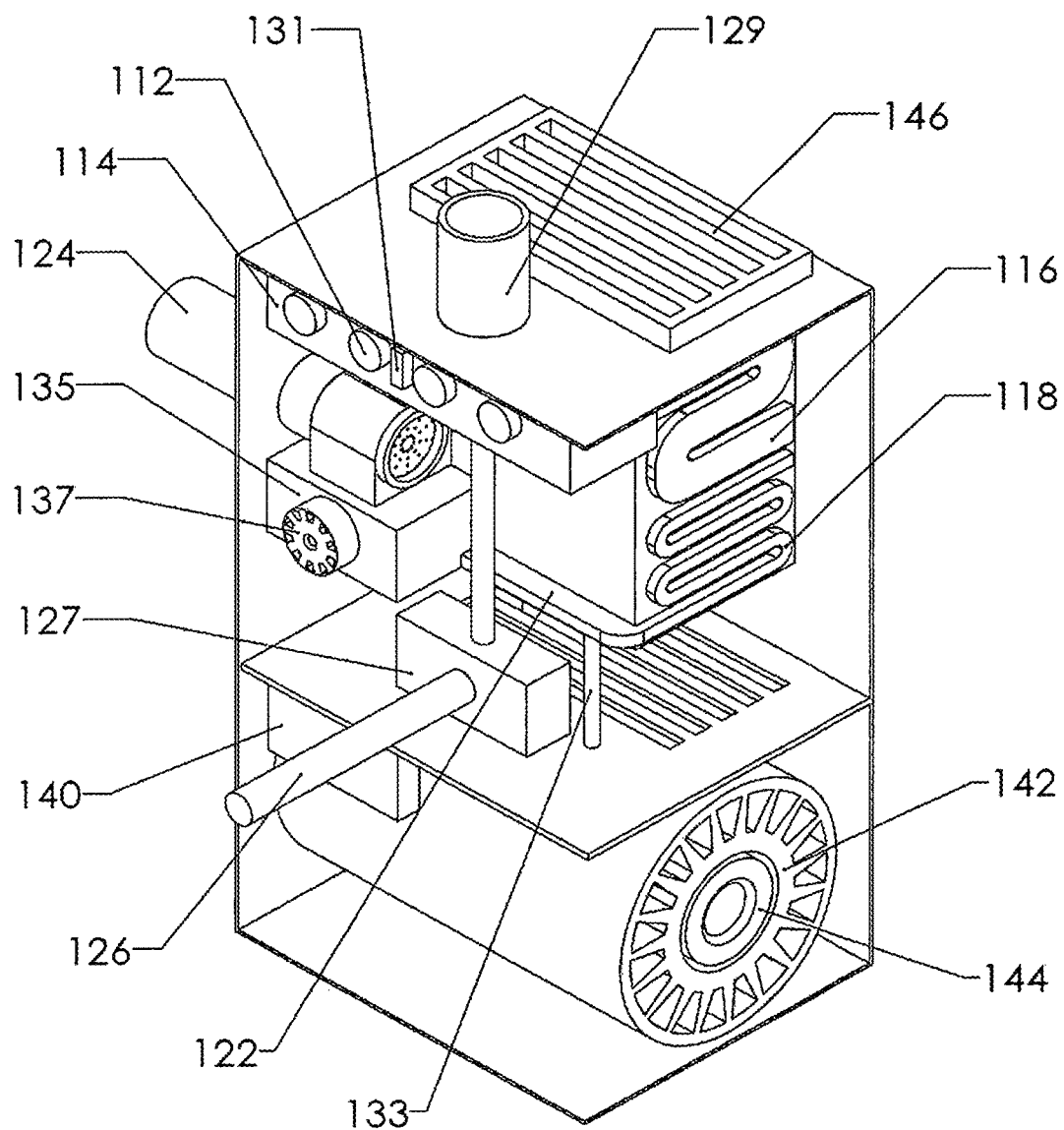
FIG. 1 is a cut-away view of an example, air-heating, single-stage, condensing furnace to which the present invention can be applied.

In more detail, referring to FIG. 1 a cut-away view of an example, single-stage, condensing furnace 110 is seen to which the present invention can be applied. A burner 112 is provided. The burner 112 comprises a burner box 114 in communication with a heat exchanger 116. A condensing heat exchanger 118 is connected at the other end of the heat exchanger 116. A discharge end 120 of the condensing heat exchanger 118 is connected to a collector box 122 and an exhaust vent 124. A gas feed line 126 provides the gas to the furnace 110.

In operation, a gas valve 127 meters the flow of gas to the burner 112 where combustion air from air inlet 129 is mixed and ignited by igniter assembly 131. The hot gas is then passed through the heat exchanger 116 and the condensing heat exchanger 118, as shown by the arrows. The relatively cool exhaust gases then pass through the collector box 122 and the exhaust vent 124 to be vented to the atmosphere. Meanwhile, the condensate flows from the collector box 122 through a condensate drain line 133 to be drained. Flow of combustion air into the air inlet 129 through the heat exchangers 116, 118 and exhaust vent 124 is enhanced by a draft-induced blower 135, which is driven by a variable speed inducer motor 137 in response to control signals from the furnace control 140.

Air is drawn into a blower 142 driven by a drive motor 144, in response to signals received from the furnace control 140. The discharge air from the blower 142 passes over the condensing heat exchanger 118 and the heat exchanger 116, in counter flow relationship with the hot combustion gases, thereby heating air, which then flows from the discharge opening 146 to the duct system within the building.

Figure 2:
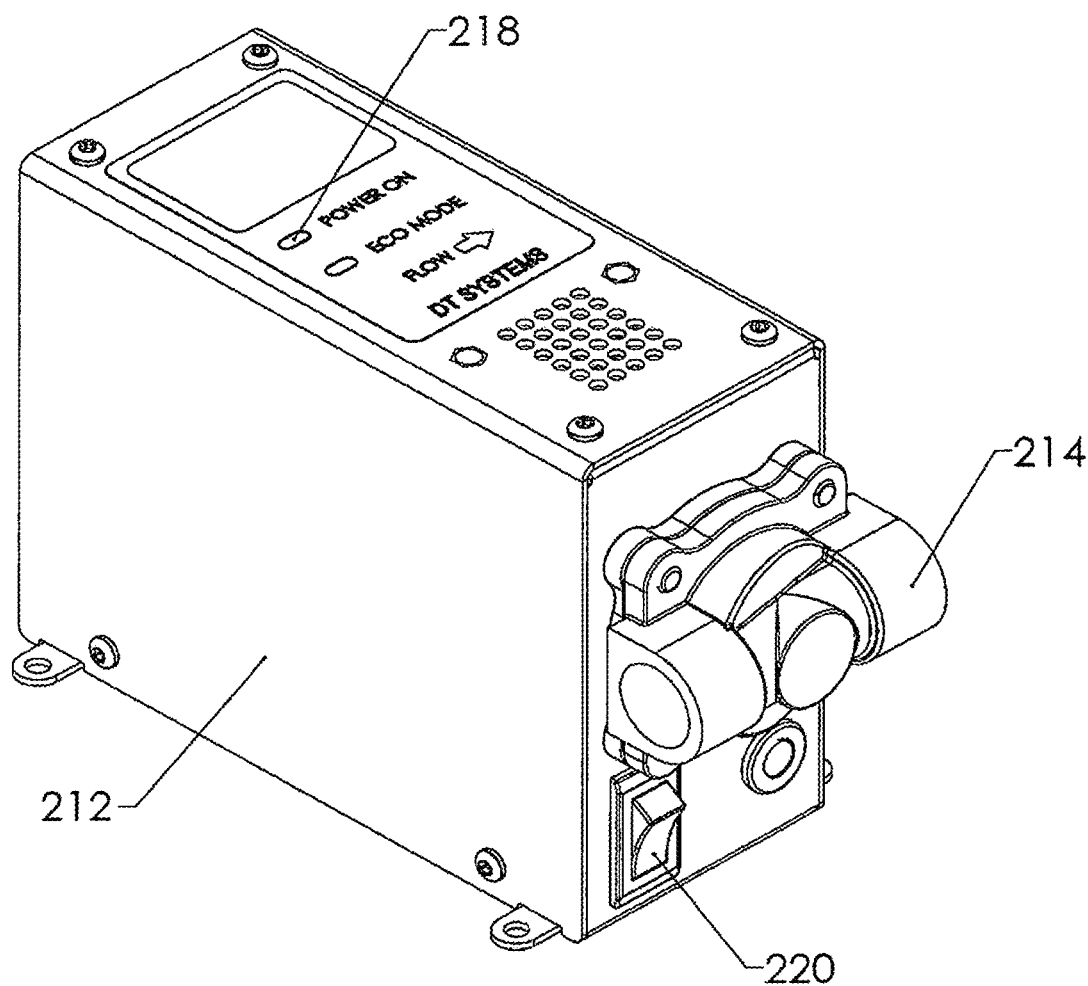
FIG. 2 is a perspective view of an example furnace unit in accordance with the principles of the present invention.
Figure 3:
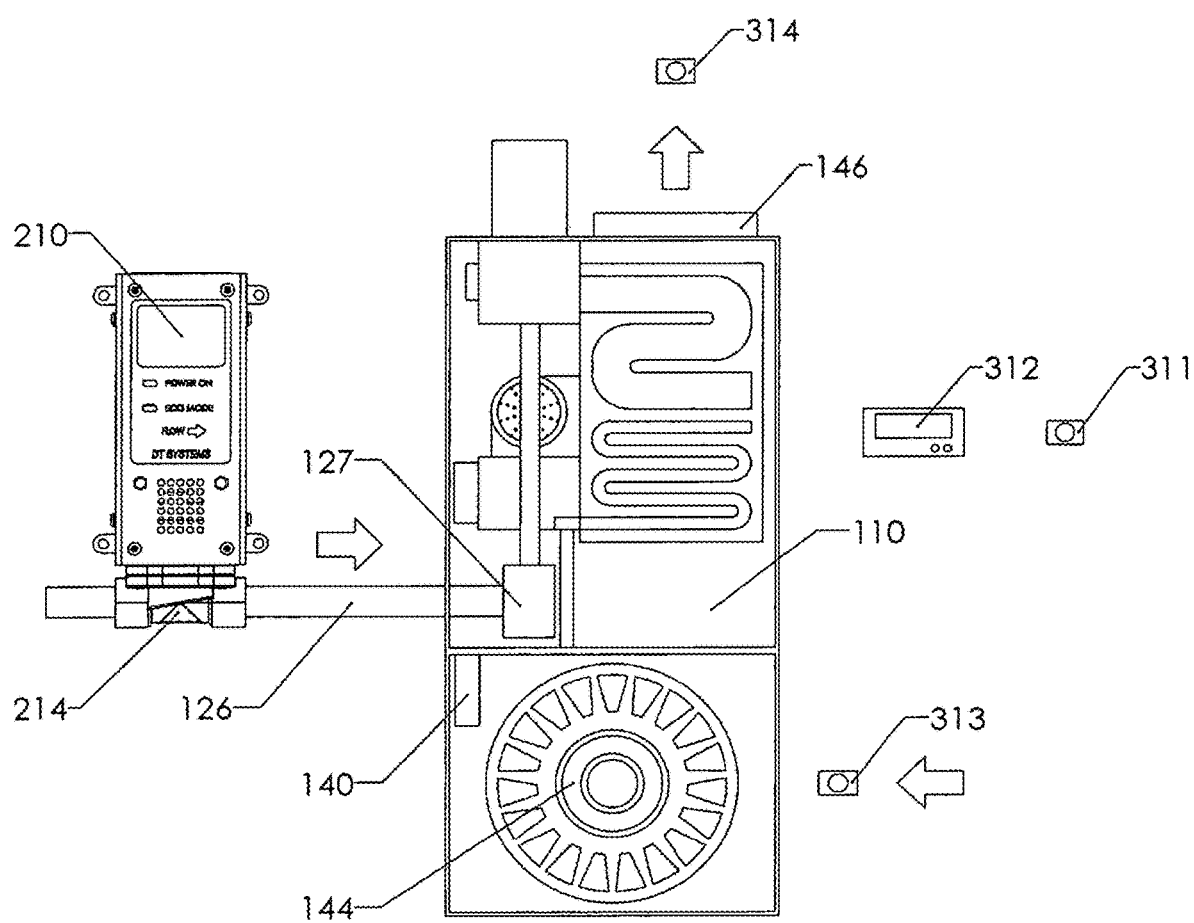
FIG. 3 is a schematic diagram of the example furnace unit of FIG. 2 in line with an example furnace.

Referring to FIG. 2, a perspective view of an example furnace unit 210 in accordance with the principles of the present invention is seen. As seen in FIG. 3, the furnace unit 210 can be installed outside of the furnace 110 in-line with a gas feed 126. The operation of the furnace can be sensed, for example, by accepting an input from thermostat controller, monitoring the solenoid valves or other signals inside the furnace, monitoring the temperature change between the inlet and outlet air ducts of the furnace, sensing gas flow, a flow meter/detector/switch, and combinations thereof. Different types of sensing technology can be utilized including, for example, but not limited to pressure sensors, flow meters, ultrasound, sound, vibrations, an internal ball free to move from the flow of gas bridging either contacts, tripping an infrared frequency (IR) light sensor, triggering a magnet sensor, and combinations thereof.

The furnace unit 210 modulates gas flow based on criteria such as the current operating conditions of the furnace, temperature output of the furnace, outdoor temperature conditions, a learning method, and combinations thereof. The furnace unit 210 can modulate the gas flow by any method, such as for example opening or closing a binary valve with a bypass orifice in parallel, adjusting the orifice size from completely closed to completely open, adjusting the orifice size to any position in between open and closed using a multi position valve or any other method. The furnace unit 210 may also modulate the speed of the blower fan to increase comfort and efficiency.

Figure 4:
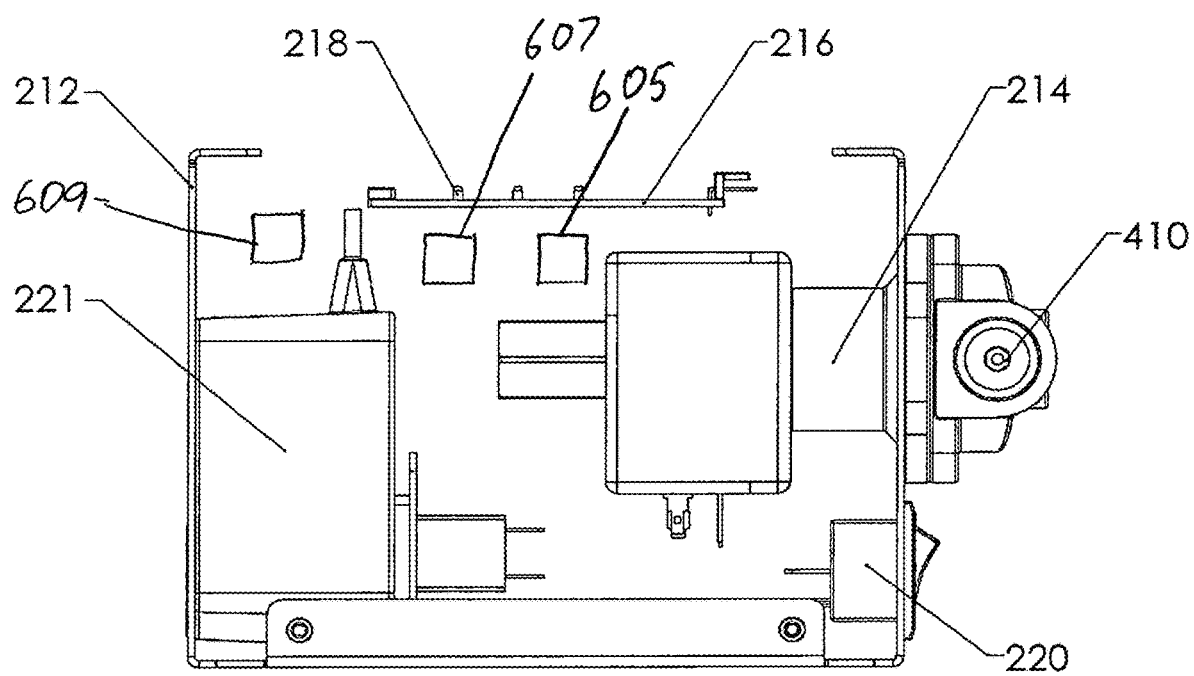
FIG. 4 is a side view of internal components of the example furnace unit of FIG. 2.

The furnace unit 210 is contained in housing 212. Referring to FIG. 4, a side view of internal components of the example furnace unit of FIG. 2 is seen. The housing 212 comprises modulating valve 214 (described in detail below), a printed circuit board (PCB) 216 that includes a microcontroller (not seen), indicators such as for example light emitting diodes (LEDS) 218 to indicate power on and eco mode (to indicate when the furnace unit is performing), detection circuitry, relays, temperature sensors, power such as a 110 volt alternative current (AC)/24 volt direct current (DC) power supply 221 to power the printed circuit board, an on/off switch 220, etc. The furnace unit 210 can also be in wireless or wired communication to a central server via the Internet.

The micro controller makes decisions based on for example the current furnace conditions, the previous history of furnace operation, furnace input and output temperatures, time of year, outdoor weather conditions, and combinations thereof. The outdoor weather conditions can be measured either with a temperature sensor or looked up via a database through the Internet.

Figure 5:
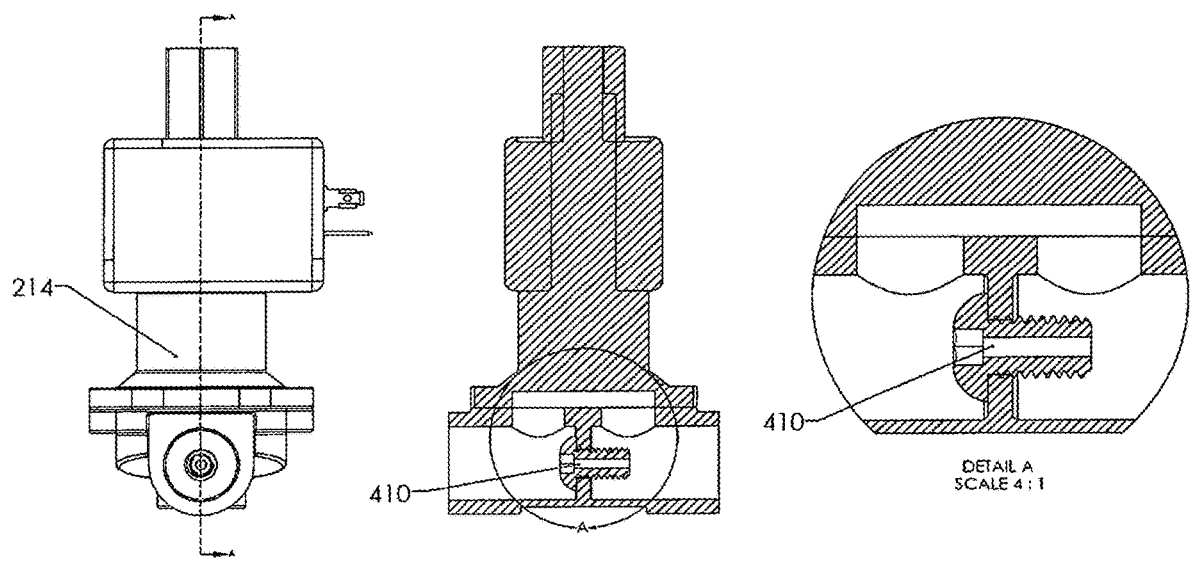
FIG. 5 is a detailed, cross-sectional view of a modulating valve portion of the example furnace unit of FIG. 2.

In more detail, the furnace unit 210 modulates gas by switching the flow between a bypass and full flow paths with an electromechanical valve 214, or with one multi position valve with no bypass. Referring to FIG. 5, a detailed, cross-sectional view of a portion of the example furnace unit of FIG. 2 is seen. The furnace unit 210 modulates gas by utilizing an internal valve with a bypass port 410 or externally with a bypass tube. This can be embodied with a valve that consists of a bi- or multi-position solenoid valve with a bypass port either molded in the valve body, drilled through the valve or a parallel flow path external to the valve body. This bypass port size can be adjusted to compensate for furnace British thermal units (BTU) with interchangeable orifice sizes. Alternatively, the orifice size may be adjusted manually with a setscrew or electronically with a multi-position valve. Another embodiment contains a multi position electromechanical valve that provides infinite orifice size adjustment from fully closed to fully open with no bypass.

The present invention can monitor the operating condition of the furnace through a number of methods. The simplest method is to receive electrical signals from a thermostat 312

(FIG. 3) or the furnace 110. It is believed that receiving the command directly from the solenoid valve of the furnace will be the most beneficial in terms of timing consistency across furnace makes and brands. In this implementation, the sensor circuit detects when there is a voltage applied to the solenoid valve in the furnace and the micro controller makes decisions based on a method to open, close or change the position of the single or multistage electromechanical valve.

In additional implementations, a furnace return air temperature sensor 313, furnace conditioned air temperature sensor 314 or an outdoor air temperature sensor 311 can be utilized to control the furnace unit 210. These implementations can be used alone or in conjunction with other methods, and based on the method open, close or change the position of the single or multistage electromechanical valve. Other methods involve sensing gas flow, with a flow meter/detector/switch, which can be achieved through several types of sensing technology, including but not limited to pressure sensors, flow meters, ultrasound, sound, vibrations, an internal ball free to move from the flow of gas bridging either contacts, tripping an IR/light sensor, or triggering magnet sensor. The decision to open, close or change the position of the single or multistage electromechanical valve can be based on the history of previous triggers, learning algorithm, current temperature, and combinations thereof.

Figure 7:
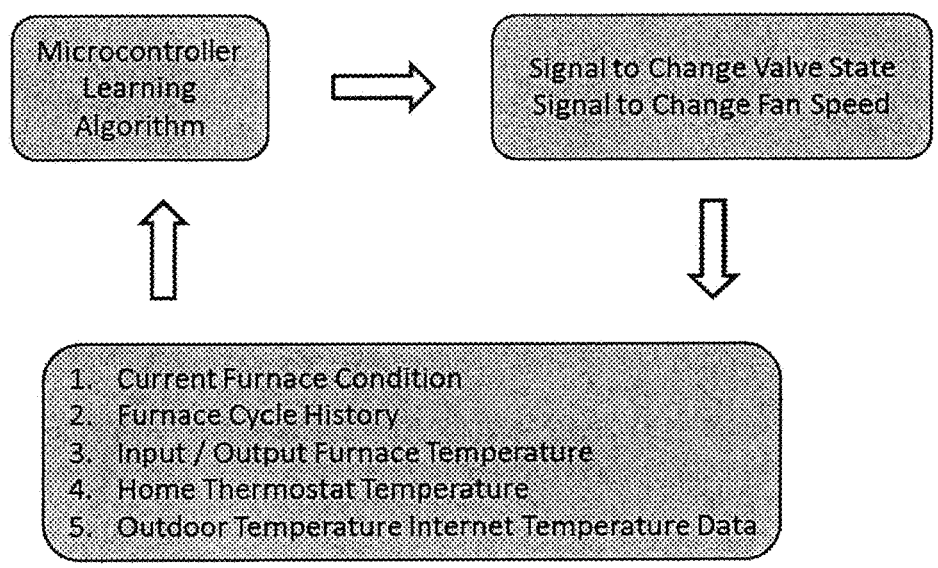
FIG. 7 is flow chart of an example process in accordance with the principles of the present invention.

In one implementation, the learning method takes into account aspects selected from current furnace conditions, previous history of furnace operation, furnace input and output temperatures, time of year, outdoor weather conditions, and combinations thereof. The micro controller then decides whether to open, or close, a binary valve or vary the position in the case of a multi-position valve. The speed of the blower fan can also be varied based on the method. FIG. 7 is a flow cart of an example process in accordance with the principles of the present invention.

Figure 6:
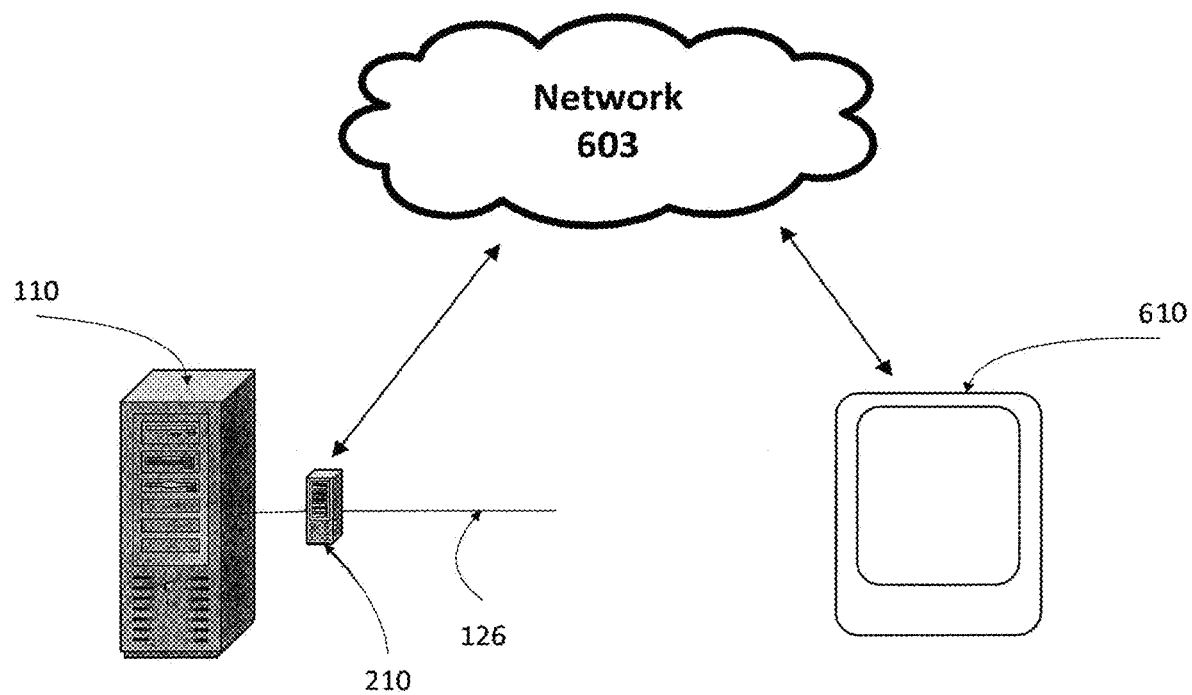
FIG. 6 is a schematic view a furnace unit in communication with a base unit in accordance with the principles of the present invention.

In additional implementations, a base unit 610 in electrical communication with the furnace unit 210 can be provided, as seen in FIG. 6. The base unit 610 can determine energy consumption usage and savings as well as allowing usage interface with the end user. The base unit 610 can have wireless connectivity with the furnace unit 210, such as for example Wi-Fi® and Bluetooth connectivity for end-users to monitor through a web-based computer interface or mobile device application via a network 603, the fuel consumption and savings compared to fuel consumption without the furnace unit 210, including conversion of the data to dollars based upon the cost of fuel being consumed. Wi-Fi®, a trademark of the Wi-Fi Alliance, 10900-B Stonelake Boulevard, Suite 126, Austin, Texas 78759, is a technology for wireless local area networking based on the IEEE 802.11 standards. Bluetooth, managed by the Bluetooth Special Interest Group, 5209 Lake, Washington Boulevard N.E., Suite 350, Kirkland, Washington 98033, is a wireless technology standard for exchanging data over short distances (using short-wavelength UHF radio waves in the ISM band from 2.4 to 2.485 GHz).

In additional implementations, end-users can also monitor real-time gas consumption and costs associated with the usage of the furnace 110 with the furnace unit 210. This feature can be integrated the base unit 610 and the web-based computer interface and mobile device application. In addition to the furnace unit 210 automatically adjusting gas flow, in an aspect of the present invention end-users can manually adjust gas flow through the furnace unit 210 utilizing the base unit 610 and the web-based computer interface or mobile device application.

As seen in FIG. 4, the furnace unit 210 can also have a gas sensor 605 to detect furnace 110 gas leaks, which can notify the end-user of the leak through the base unit 610 and the web-based computer interface or mobile device application. In accordance with an aspect of the present invention, the furnace unit 210 can also have a $CO_2$ sensor 607 to detect carbon monoxide, which can immediately turn off the furnace 110 so that the furnace 110 stops creating carbon monoxide. In an aspect of the present invention, the furnace unit 210 can also have a power sensor 609 and can notify the end-user through the base unit 610 and the web-based computer interface and mobile device application if there is a power loss to the furnace 110.

While the invention has been described with specific embodiments, other alternatives, modifications, and variations will be apparent to those skilled in the art. Accordingly, it will be intended to include all such alternatives, modifications and variations set forth within the spirit and scope of the appended claims.

What is claimed is:

1. A furnace accessory for a single-stage, air heating, gas forced air condensing furnace comprising:
   an aftermarket furnace unit external to the furnace and adapted to be mounted to the furnace, the aftermarket furnace unit adapted to be installed in-line with a gas source;
   a power supply in electronic communication with the aftermarket furnace unit, the power supply providing power to the aftermarket furnace unit;
   a modulator contained within the aftermarket furnace unit, the modulator comprises a valve, the modulator in gaseous communication with the gas source, the modulator powered from the power supply;
   a furnace sensor powered by the power supply, the furnace sensor sensing furnace criteria related to operation of the furnace; and
   a microcontroller powered by the power supply, the microcontroller receiving from the furnace sensor furnace criteria, the microcontroller controlling the modulator based on the furnace criteria.

2. The furnace accessory of claim 1 further wherein the modulator comprises a bypass path controlled by an electromechanical value.

3. The furnace accessory of claim 1 further wherein the modulator comprises a solenoid valve.

4. The furnace accessory of claim 1 further wherein the modulator comprises a multi position electromechanical valve.

5. The furnace accessory of claim 1 further wherein the furnace criteria is sensed from electrical signals from the furnace.

6. The furnace accessory of claim 5 further wherein the electrical signals from the furnace are sensed from receiving a command from a solenoid valve of the furnace.

7. The furnace accessory of claim 1 further wherein the furnace criteria is selected from the group consisting of input from a thermostat controller, monitoring solenoid valves inside the furnace, monitoring temperature change between inlet and outlet air ducts of the furnace, detecting gas flow, and combinations thereof.

8. The furnace accessory of claim 1 further comprising an environmental sensor powered by the power supply, the environmental sensor sensing environmental criteria related to the operation of the furnace.

9. The furnace accessory of claim 8 further wherein the environmental criteria is selected from the group consisting of outdoor temperature conditions, time of year, and combinations thereof.

10. The furnace accessory of claim 1 further wherein the sensor is selected from the group consisting of pressure sensors, flow meters, ultrasound sensors, sound sensors, vibration sensors, an internal ball free to move from the flow of gas bridging either contacts, tripping an infrared frequency light sensor, triggering a magnet sensor, and combinations thereof.

11. The furnace accessory of claim 1 further comprising a base unit in electrical communication with the aftermarket furnace unit, the base unit determining energy consumption and savings.

12. The furnace accessory of claim 11 further wherein the base unit determines the difference in gas consumption with the furnace accessory compared to gas consumption without the furnace accessory, including conversion of the determined difference to monetary funds based upon the cost of gas being consumed.

13. The furnace accessory of claim 11 further wherein the base unit is in wireless electrical communication with the aftermarket furnace unit.

14. The furnace accessory of claim 11 further wherein the base unit is selected from the group consisting of a web-based computer interface and a mobile device application.

15. The furnace accessory of claim 11 further wherein end-users can monitor simultaneous gas consumption and costs associated with usage of the furnace with the base unit.

16. The furnace accessory of claim 11 further wherein end-users can manually adjust gas flow through the aftermarket furnace unit utilizing the base unit.

17. The furnace accessory of claim 1 further wherein the aftermarket furnace unit further includes a malfunction sensor.

18. The furnace accessory of claim 17 further wherein the aftermarket furnace unit further includes a gas sensor to detect furnace gas leaks.

19. The furnace accessory of claim 18 further comprising a base unit in electrical communication with the aftermarket furnace unit, the base unit notifying an end-user of a furnace gas leak detected by the gas sensor.

20. The furnace accessory of claim 17 further wherein the aftermarket furnace unit further includes a carbon monoxide sensor to detect carbon monoxide.

21. The furnace accessory of claim 20 further comprising a base unit in electrical communication with the aftermarket furnace unit, the base unit notifying an end-user of the presence of carbon monoxide detected by the carbon monoxide sensor.

22. The furnace accessory of claim 20 further wherein, when carbon monoxide is detected, the base unit instructs the aftermarket furnace unit to turn off the furnace or turn off gas flow.

23. The furnace accessory of claim 17 wherein the aftermarket furnace unit further includes a power sensor to detect a power loss to the furnace.

24. The furnace accessory of claim 23 further wherein the base unit notifies the end-user of the power failure detected by the power sensor.

25. The furnace accessory of claim 1 further comprising a blower fan of the furnace being modulated.

26. The furnace accessory of claim 1 further wherein the gas is selected from the group consisting of natural gas and propane gas.

27. The furnace accessory of claim 1 further wherein the microcontroller comprises a learning method, the learning method taking into account aspects selected from the group consisting of current furnace conditions, previous history of furnace operation, furnace input and output temperatures, time of year, outdoor weather conditions, and combinations thereof.

* * * * *